(12) United States Patent
Wada et al.

(10) Patent No.: US 8,784,740 B2
(45) Date of Patent: Jul. 22, 2014

(54) EXHAUST GAS DENITRIZER

(75) Inventors: Toshimichi Wada, Hiroshima (JP);
Katsuhiro Yashiro, Hiroshima (JP);
Masafumi Ishizaki, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 670 days.

(21) Appl. No.: 13/058,342

(22) PCT Filed: Aug. 21, 2009

(86) PCT No.: PCT/JP2009/004009
§ 371 (c)(1),
(2), (4) Date: Feb. 10, 2011

(87) PCT Pub. No.: WO2010/023852
PCT Pub. Date: Mar. 4, 2010

(65) Prior Publication Data
US 2011/0150716 A1 Jun. 23, 2011

(30) Foreign Application Priority Data
Aug. 25, 2008 (JP) ................................ 2008-215992

(51) Int. Cl.
*B01D 53/90* (2006.01)
(52) U.S. Cl.
USPC ........................... 422/173; 422/176; 137/897
(58) Field of Classification Search
USPC .................. 422/172, 173, 176, 177; 138/39; 137/896, 897
See application file for complete search history.

(56) References Cited

U.S. PATENT DOCUMENTS

| 4,160,009 A | 7/1979 | Hamabe |
| 5,002,121 A | 3/1991 | von Erichsen |
| 5,435,976 A * | 7/1995 | Berner et al. ................. 422/168 |

FOREIGN PATENT DOCUMENTS

| JP | 54-114866 A | 9/1979 |
| JP | 59040004 A | 3/1984 |
| JP | 61117989 U | 7/1986 |
| JP | 1081447 U | 5/1989 |
| JP | 06-011132 A | 1/1994 |

OTHER PUBLICATIONS

European Search Report for EP 09809508.6 dated Apr. 17, 2012.
International Search Report for PCT/JP2009/004009 dated Nov. 17, 2009.

(Continued)

*Primary Examiner* — Jill Warden
*Assistant Examiner* — Joye L Woodard
(74) *Attorney, Agent, or Firm* — Heslin Rothenberg Farley & Mesiti P.C.

(57) ABSTRACT

An exhaust gas denitrizer removes nitrogen oxides from rejoined exhaust gas using a denitrification reactor after supplying ammonia gas to the rejoined exhaust gas made up of main exhaust gas cooled by a fuel economizer by flowing through a main duct and bypass exhaust gas maintained at high temperature by flowing through a bypass duct adapted to bypass the fuel economizer. At a meeting place between the main exhaust gas and bypass exhaust gas in the main duct, three partition plates are installed with plate surfaces turned to an inflow direction of the bypass exhaust gas, partitioning a main exhaust gas channel into a plurality of sub-channels. Upstream-side ends of the partition plates face the incoming bypass exhaust gas by being shifted from one another toward an upstream side of the main exhaust gas starting from an inflow side of the bypass exhaust gas.

3 Claims, 4 Drawing Sheets

(56) References Cited

OTHER PUBLICATIONS

Microfilm of the specification and drawings annexed to the request of Japanese Utility Model Application No. 139392/1987 (Laid-open No. 46628/1989), Mitsubishi Heavy Industries, Ltd., Mar. 22, 1989.
Microfilm of the specification and drawings annexed to the request of Japanese Utility Model Application No. 019962/1988 (Laid-open No. 129549/1989), Mitsubishi Heavy Industries, Ltd., Sep. 4, 1989.
Microfilm of the specification and drawings annexed to the request of Japanese Utility Model Application No. 171408/1987 (Laid-open No. 081447/1989), Mitsubishi Heavy Industries, Ltd., May 31, 1989.
Microfilm of the specification and drawings annexed to the request of Japanese Utility Model Application No. 089404/1981 (Laid-open No. 204030/1982), Mitsubishi Heavy Industries, Ltd., Dec. 25, 1982.

* cited by examiner

EXHAUST GAS DENITRIZER

CROSS REFERENCE TO RELATED APPLICATIONS

This application is the U.S. National Filing of PCT Application No. PCT/JP2009/004009 filed on Aug. 21, 2009 and published in Japanese as WO2010/023852 on Mar. 4, 2010. This application also claims priority to JP 2008-215992 filed on Aug. 25, 2008, the entire disclosure of these applications are hereby incorporated herein by reference.

TECHNICAL FIELD

The present invention relates to an exhaust gas denitrizer for exhaust combustion gas discharged from a furnace of a boiler or the like and containing sulfur oxides and nitrogen oxides, and more particularly, to an exhaust gas denitrizer equipped with a bypass duct which branches off from a main duct for passing exhaust combustion gas, bypasses a heat exchanger, and rejoins the main duct.

BACKGROUND ART

Exhaust combustion gas generated as a result of combustion, for example, in a furnace of a boiler or the like has its heat recovered by a heat exchanger and fuel economizer while passing through a main duct. Then, the exhaust combustion gas is supplied with ammonia gas for reduction and removal of nitrogen oxides in the exhaust gas and led into a denitrification reactor filled with a catalyst for nitrogen oxide removal.

Here, if sulfur oxides (especially $SO_3$) exist in the exhaust gas and exhaust gas temperature is low (normally below somewhere between 250 and 330° C. although this depends on concentrations of ammonia and sulfur oxides in the exhaust gas), the sulfur oxides react with ammonia gas, resulting in deposition of acidic ammonium sulfate.

The acidic ammonium sulfate, which is in a liquid state, adheres to surfaces of the catalyst and thereby covers active catalyst sites, resulting in performance degradation of the catalyst. Thus, operation of the exhaust gas denitrizer is conditional on keeping the temperature of the exhaust gas flowing into the exhaust gas denitrizer above the temperature at which acidic ammonium sulfate starts to deposit.

To satisfy this condition, it is a known practice to install a bypass duct which branches off from a main duct on an upstream side of a fuel economizer and rejoins the main duct on a downstream side of the fuel economizer as described, for example, in Patent Literature 1. That is, bypass exhaust gas which bypasses the fuel economizer by flowing through the bypass duct is maintained at high temperature without being cooled, and consequently, the temperature of the exhaust gas after rejoining main exhaust gas flowing through the main duct can be kept above the temperature at which acidic ammonium sulfate starts to deposit.

CITATION LIST

Patent Literature

Patent Literature 1: Japanese Utility Model Laid-Open No. 1-81447

SUMMARY OF INVENTION

Technical Problem

However, the technique described in Patent Literature 1 does not give consideration to how to even out the temperature of the rejoined exhaust gas quickly.

That is, when the bypass exhaust gas flows into the main exhaust gas with high kinetic energy, most of the high-temperature bypass exhaust gas reaches far in an inflow direction (on the side of a main duct wall), and does not spread widely on the near side in the inflow direction. Consequently it takes time for the rejoined exhaust gas to be mixed, thereby reaching a uniform temperature.

Therefore, in order to keep the temperature of the rejoined exhaust gas uniform above the temperature at which acidic ammonium sulfate starts to deposit, it is necessary to increase the length of the duct between a meeting place of the exhaust gases and a place where ammonia gas is supplied. However, this is not desirable from the viewpoint of demand for compact design of the equipment.

In order to even out the temperature of the rejoined exhaust gas quickly while reducing the duct size, it is conceivable, for example, to install a mixer in the duct to facilitate mixing of the rejoined exhaust gas. In this case, however, the mixer will produce draft resistance, resulting in increased duct pressure losses, which is not desirable.

Thus, an object of the present invention is to even out temperature of rejoined exhaust gas quickly while curbing increases in duct pressure losses.

Solution to Problem

In basic configuration, an exhaust gas denitrizer according to the present invention includes a main duct adapted to pass exhaust combustion gas discharged from a furnace and containing sulfur oxides and nitrogen oxides; a heat exchanger placed in the main duct and adapted to cool the exhaust combustion gas by heat exchange; a bypass duct adapted to branch off from the main duct upstream side of the heat exchanger, bypass the heat exchanger, and rejoin the main duct; an ammonia feed system adapted to supply ammonia gas to the exhaust combustion gas after bypass exhaust gas flowing through the bypass duct rejoins main exhaust gas flowing through the main duct; and a denitrification reactor adapted to remove nitrogen oxides from the exhaust combustion gas supplied with the ammonia gas.

In particular, to solve the above problems, the exhaust gas denitrizer is characterized in that: at a meeting place between the main exhaust gas and the bypass exhaust gas in the main duct, a plurality of partition plates are installed with plate surfaces turned to an inflow direction of the bypass exhaust gas, partitioning a main exhaust gas channel into a plurality of sub-channels along a flowing direction of the main exhaust gas, where upstream-side ends of the plurality of partition plates along an inflow direction of the main exhaust gas face the incoming bypass exhaust gas by being shifted from one another toward an upstream side of the main exhaust gas starting from an inflow side of the bypass exhaust gas.

That is, the partition plates installed in this way cause the bypass exhaust gas flowing into the main duct to change flowing direction by coming into contact with the individual partition plates and to flow downstream of the main exhaust gas while being mixed with the main exhaust gas in the individual sub-channels formed by the respective partition plates. Consequently, the bypass exhaust gas is spread uniformly from the near side toward the far side in the inflow direction of the bypass exhaust gas, that is, in radial direction of the main duct, equalizing flow ratios between the main exhaust gas and bypass exhaust gas among the respective sub-channels. Also, the partition plates, which are installed along the inflow direction of the main exhaust gas, do not significantly affect draft resistance. This makes it possible to even out the temperature of the rejoined exhaust gas quickly while curbing increases in duct pressure losses.

In this case, preferably a turnable adjustment vane is installed at the meeting place of the bypass duct with the main duct to adjust flow direction of the bypass exhaust gas flowing into the main duct.

That is, when a flow rate of the bypass exhaust gas is adjusted with a damper or the like installed in the bypass duct based, for example, on the temperature of the rejoined exhaust gas, the flow ratio between the main exhaust gas and bypass exhaust gas will vary. Even in such a case, since the flow direction of the bypass exhaust gas flowing into the main duct is adjusted by adjusting a tilt angle of the adjustment vane, the bypass exhaust gas can be spread uniformly in the respective sub-channels formed by the partition plates, equalizing the flow ratios between the two types of exhaust gas among the respective sub-channels.

Also, even when the flow ratio between the main exhaust gas and bypass exhaust gas is fixed to some extent, if streams of bypass exhaust gas flowing through the respective sub-channels formed by the partition plates vary from one another, differing from a design value, the adjustment vane can be used to make adjustments so as to produce a uniform flow.

The tilt angle of the adjustment vane can be adjusted according to the flow ratio between the main exhaust gas and bypass exhaust gas. For example, the flow ratio between the two types of exhaust gas and the corresponding tilt angle of the adjustment vane which will equalize the flow ratios between the two types of exhaust gas among the respective sub-channels can be determined by experiment or the like in advance and stored in memory as a table or as numeric values. Then, by installing flowmeters in the two ducts to output the tilt angle using flowmeter readings as input values, the tilt angle can be adjusted based on the output value.

Advantageous Effects of Invention

The present invention can even out the temperature of the rejoined exhaust gas quickly while curbing increases in duct pressure losses.

DESCRIPTION OF EMBODIMENTS

Figure 1:
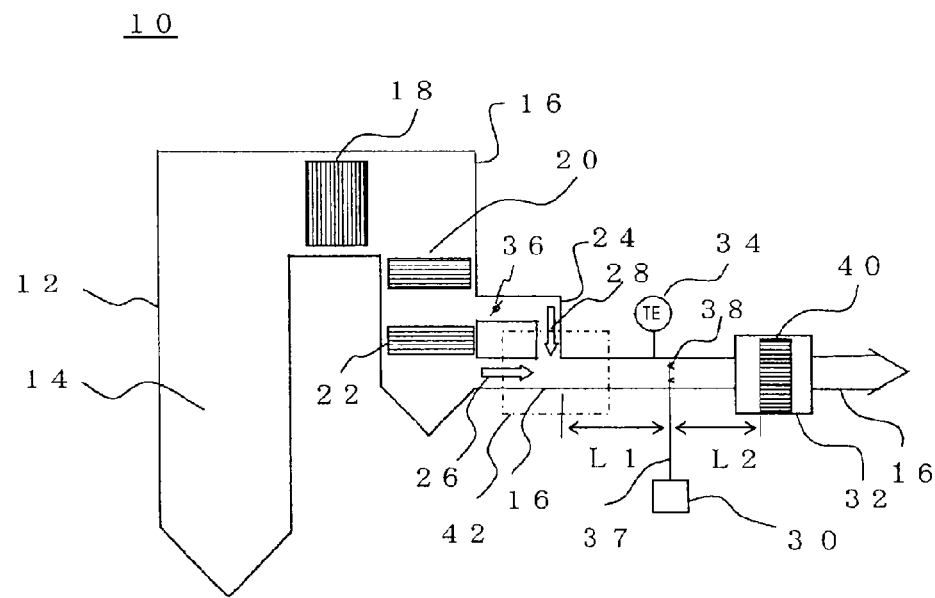
FIG. 1 is a longitudinal sectional view schematically showing an overall configuration of an exhaust gas line using an exhaust gas denitrizer according to the present embodiment.

An embodiment of an exhaust gas denitrizer resulting from application of the present invention will be described below. Incidentally, in the following description, the same functional components are denoted by the same reference numerals, and redundant description thereof will be omitted.

FIG. 1 is a longitudinal sectional view schematically showing an overall configuration of an exhaust gas line using the exhaust gas denitrizer according to the present embodiment. Incidentally, according to the present embodiment, a boiler is taken as an example of an exhaust gas source, and the exhaust gas denitrizer is used for exhaust combustion gas discharged from the boiler. However, this is not restrictive, and the exhaust gas denitrizer is applicable to discharged exhaust combustion gas containing sulfur oxides and nitrogen oxides.

As shown in FIG. 1, the exhaust gas denitrizer 10 according to the present embodiment includes a main duct 16 adapted to pass exhaust combustion gas discharged from a furnace 14 of a boiler 12 and containing sulfur oxides and nitrogen oxides, heat exchangers 18 and 20 placed in the main duct 16 and adapted to cool the exhaust combustion gas by heat exchange, and a fuel economizer 22 similarly placed in the main duct 16 and adapted to lower the temperature of the exhaust combustion gas by heat exchange. The heat exchangers 18 and 20 and the fuel economizer 22 are installed in series in this order starting from an upstream side of the exhaust combustion gas.

Also, the exhaust gas denitrizer 10 includes a bypass duct 24 adapted to branch off from the main duct 16 between the heat exchanger 20 and fuel economizer 22, bypass the fuel economizer 22, and rejoin the main duct 16; an ammonia feed system 30 adapted to supply ammonia gas to the exhaust combustion gas after bypass exhaust gas 28 flowing through the bypass duct 24 rejoins main exhaust gas 26 flowing through the main duct 16; and a denitrification reactor 32 adapted to remove nitrogen oxides from the exhaust combustion gas supplied with ammonia gas.

A temperature sensor 34 adapted to detect the temperature of the exhaust combustion gas is installed at a location upstream of, and adjacent to, that portion of the main duct 16 where ammonia gas is supplied. Also, a bypass damper 36 is installed in the bypass duct 24, where the bypass damper 36 is turnable and adapted to control flow volume of the bypass exhaust gas 28 flowing through the bypass duct 24, based on the temperature detected by the temperature sensor 34.

Incidentally, the ammonia feed system 30 is intended to lead ammonia gas used for reduction and removal of the nitrogen oxides in the exhaust combustion gas into the main duct via a conduit 37 and supply the ammonia gas to the exhaust combustion gas using an injection nozzle 38. The denitrification reactor 32 is filled with a catalyst 40 used to remove the nitrogen oxides from the exhaust combustion gas.

Next, description will be given of a step in which the exhaust combustion gas discharged from the furnace 14 of the boiler 12 is processed in the exhaust gas denitrizer.

The exhaust combustion gas generated as a result of combustion in the furnace 14 of the boiler 12 has heat recovered therefrom by the heat exchangers 18 and 20 and the fuel economizer 22 being installed most downstream of the three, and then has ammonia gas injected thereinto by the ammonia feed system 30. Then, the exhaust combustion gas is introduced into the denitrification reactor 32, where nitrogen oxides are removed from the exhaust combustion gas by the action of the catalyst 40.

Here, if sulfur oxides (especially $SO_3$) exist in the exhaust combustion gas and exhaust gas temperature is low (normally below somewhere between 250 and 330° C. although this depends on concentrations of ammonia and sulfur oxides in the exhaust gas), the sulfur oxides react with ammonia gas, resulting in deposition of acidic ammonium sulfate.

The acidic ammonium sulfate, which is in a liquid state, adheres to surfaces of the catalyst 40 and thereby covers active catalyst sites, resulting in performance degradation of the catalyst. Thus, as a condition for operation of the exhaust gas denitrizer 10, the temperature of the exhaust gas flowing into the portion where ammonia gas is supplied needs to be kept above the temperature at which acidic ammonium sulfate starts to deposit.

Boiler outlet exhaust gas temperature, i.e., outlet exhaust gas temperature of the fuel economizer 22, changes together with boiler load: remains low under conditions of low boiler load and rises as the load increases. However, a recent design trend is for a lower minimum operating load of the boiler. This is because there is a demand for a highly operational plant which can more flexibly respond to changes in power supply conditions by expanding an operating load range of the boiler.

However, in the required low-load operation, it is likely that the exhaust gas temperature is not high enough to satisfy operating temperature of the denitrizer.

Furthermore, it is required to start operating the denitrizer upon start-up of the plant when the exhaust gas temperature is low. This is because social needs dictate that a lower-pollution plant be realized by operating the denitrizer whenever possible during operation of the plant.

In this case again, it may become necessary to operate the denitrizer under conditions in which the exhaust gas temperature is not high enough to satisfy the operating temperature of the denitrizer.

In view of this point, the bypass duct 24 which bypasses the fuel economizer 22 is provided. Consequently, the bypass exhaust gas 28 flowing through the bypass duct 24 maintains high temperature without being cooled in the fuel economizer 22 and rejoins the main exhaust gas 26 cooled while flowing through the main duct 16. This makes it possible to maintain the temperature of the rejoined exhaust gas at a higher level so as to satisfy the operating temperature of the denitrizer.

In this connection, a flow rate of the bypass exhaust gas 28 which bypasses the fuel economizer 22 can be controlled by the fuel economizer bypass damper 36 based on the temperature detected by the temperature sensor 34 so that the exhaust gas temperature in the portion where ammonia gas is supplied will be kept at or above an operational temperature of the denitrizer.

Desirably the rejoined low-temperature main exhaust gas and high-temperature bypass exhaust gas are mixed, resulting in a uniform temperature distribution in a radial direction of the main duct 16 until ammonia gas is injected, i.e., until the ammonia gas reaches the injection nozzle 38. This is because if the temperature distribution is scattered, acidic ammonium sulfate will be produced in low-temperature regions, or even if acidic ammonium sulfate is not produced in the low-temperature regions, the temperature in high-temperature regions will be higher than necessary. In other words, ideally the temperature distribution is uniform and the temperature satisfies minimum requirements for preventing deposition of acidic ammonium sulfate.

Thus, in order for the temperature distribution of the exhaust combustion gas made up of the rejoined main exhaust gas and bypass exhaust gas to be uniform, duct size L1 as shown in FIG. 1 measured from the meeting place to the injection nozzle 38 needs to be long enough to mix the main exhaust gas and bypass exhaust gas sufficiently.

Figure 2:
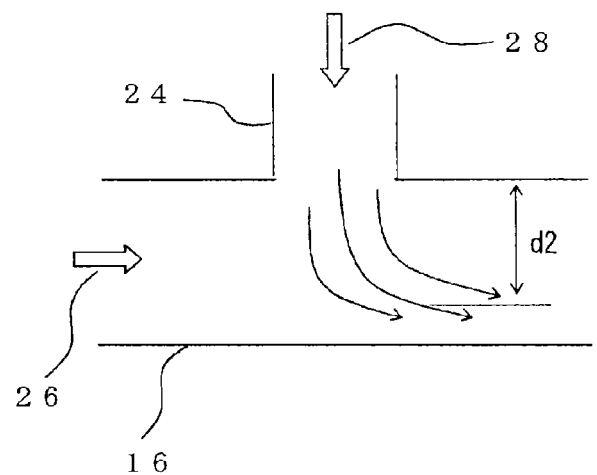
FIG. 2 is a diagram showing an example of flow at a meeting place between main exhaust gas and bypass exhaust gas.

Incidentally, when flows of the main exhaust gas and bypass exhaust gas at their meeting place are considered, the flows are, for example, as shown in FIG. 2. FIG. 2, which is an enlarged view of the meeting place 42 between the main duct 16 and bypass duct 24 shown in FIG. 1, shows exemplary flows of the main exhaust gas and bypass exhaust gas at the meeting place. As shown in FIG. 2, when the bypass exhaust gas flows into the main exhaust gas with high kinetic energy, most of the high-temperature bypass exhaust gas reaches far in an inflow direction (on the side of a main duct wall) (resulting in increased d2), and does not spread widely on the near side in the inflow direction. Consequently it takes time for the temperature of the rejoined exhaust gas to reach uniform by mixing.

Thus, it is essentially necessary to increase the L1 size. However, this goes against the demand for compact design of the denitrizer, and is not desirable.

On the other hand, in order to mix the main and bypass exhaust gases sufficiently while decreasing the L1 size, it is conceivable to install a mixer or the like between the meeting place of the two types of exhaust gas and the injection nozzle 38 to facilitate mixing of the exhaust gases. However, this will cause draft losses in the main duct 16, and is not desirable in terms of pressure losses. The draft losses result from draft resistance caused by the mixer even during high-load operation although with increases in boiler load, the exhaust gas temperature rises, eliminating the need to operate the fuel economizer bypass.

The exhaust gas denitrizer according to the present embodiment has been implemented to deal with this problem and is characterized in that multiple partition plates are installed at the meeting place between the main exhaust gas 26 and bypass exhaust gas 28 in the main duct 16. This characteristic portion will be described below with reference to various examples.

First Example

Figure 3:
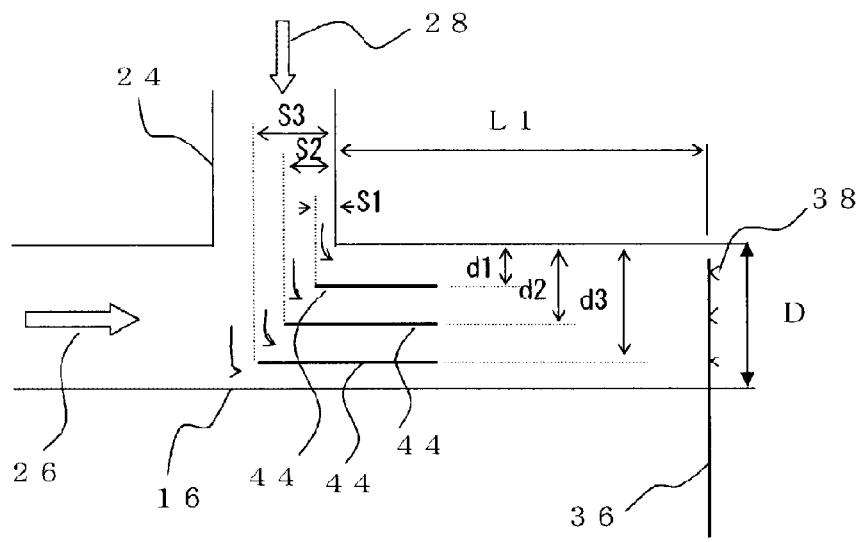
FIG. 3 is a diagram showing a first example of a characteristic portion of the exhaust gas denitrizer.

FIG. 3 is an enlarged view of the meeting place 42 between the main duct 16 and bypass duct 24 shown in FIG. 1 and is a diagram showing a first example of the characteristic portion of the exhaust gas denitrizer. As shown in FIG. 3, at the meeting place between the main exhaust gas 26 and bypass exhaust gas 28 in the main duct 16, three partition plates 44 are installed with plate surfaces turned to the inflow direction of the bypass exhaust gas 28, partitioning a main exhaust gas channel into a plurality of sub-channels along the flowing direction of the main exhaust gas 26. Also, upstream-side ends of the partition plates 44 along the inflow direction of the main exhaust gas face the incoming bypass exhaust gas by being shifted from one another toward the upstream side of the main exhaust gas starting from the inflow side of the bypass exhaust gas.

The partition plates 44 installed in this way cause the bypass exhaust gas 28 flowing into the main duct 16 to come into contact with the partition plates 44 in sequence from downstream side to upstream side of the main exhaust gas 26 and thereby flow downstream of the main exhaust gas while being mixed with the main exhaust gas 26 in the individual sub-channels formed by the respective partition plates.

Consequently, the bypass exhaust gas 28 is spread uniformly from the near side toward the far side in the inflow direction of the bypass exhaust gas, that is, in radial direction of the main duct, equalizing flow ratios between the main exhaust gas and bypass exhaust gas among the respective sub-channels. Also, the partition plates 44, which are installed along the inflow direction of the main exhaust gas 26, do not significantly affect draft resistance. Therefore, plant performance is not affected.

This makes it possible to even out the temperature of the rejoined exhaust gas quickly while curbing increases in pressure losses of the main duct 16. Also, while decreasing the duct L1 size measured from the meeting place of the two types of exhaust gas to the injection nozzle 38, the present example provides a mixing effect similar to that available with a long duct L1 size, enabling compact design of the equipment.

Although in the present example, three partition plates 44 are installed in the main duct, thereby forming four substantially uniform sub-channels, the number of partition plates is selected as appropriate depending on ratio of diameter D of the main duct to the duct size L1 measured from the meeting place between the main exhaust gas 26 and bypass exhaust gas 28 to the injection nozzle 38.

That is, the larger the duct diameter D relative to the distance L1 over which the main exhaust gas 26 and bypass exhaust gas 28 are mixed, the more significant the scattering of the temperature distribution in the radial direction of the duct, increasing the time required to even out the temperature and making it necessary increase the number of partition plates 44. In other words, since mixing characteristics are affected by the ratio of the equivalent diameter D of the duct partitioned by the partition plates 44 to the mixing distance L1, when the mixing distance L1 is short, it is necessary to increase the number of partition plates to facilitate mixing.

On the other hand, sizes S1 to S3 of the individual partition plates 44 facing the incoming bypass exhaust gas 28 as well as sizes d1 to d3 between the duct wall and the partition plates 44 are determined by taking into consideration kinetic energy of the bypass exhaust gas 28 and kinetic energy of the main exhaust gas 26. That is, the sizes S1 to S3 and sizes d1 to d3 are determined in such a way as to equalize ratios between flow rates of the main exhaust gas and flow rates of the bypass exhaust gas flowing into the individual sub-channels formed by the partition plates 44.

For concrete discussion, it is useful to use flow simulation software whose computational accuracy has improved tremendously with recent advances in computers.

Second Example

Figure 4:
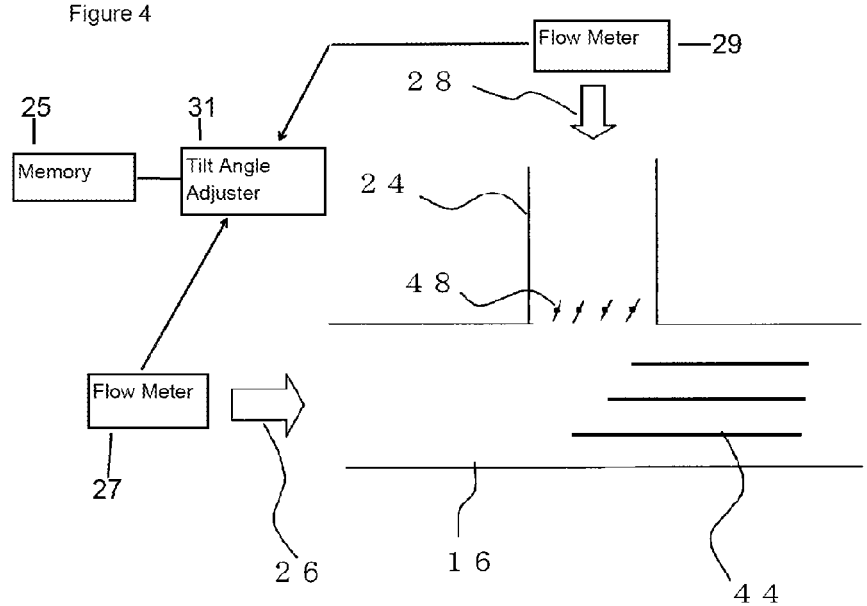
FIG. 4 is a diagram showing a second example of the characteristic portion of the exhaust gas denitrizer.

FIG. 4 is an enlarged view of the meeting place 42 between the main duct 16 and bypass duct 24 shown in FIG. 1 and is a diagram showing a second example of the characteristic portion of the exhaust gas denitrizer. In the present example, in addition to installing the partition plates 44 as in the case of the first example, adjustment vanes are installed in the bypass duct 24. Only differences from the first example will be described, and description of the other parts will be omitted.

As shown in FIG. 4, turnable adjustment vanes 48 are installed at the meeting place 42 of the bypass duct 24 with the main duct 16 to adjust flow direction of the bypass exhaust gas 28 flowing into the main duct 16.

When the bypass damper 36 is installed in the bypass duct 24 as described above and the flow rate of the bypass exhaust gas 28 is adjusted by changing a tilt angle based on detected values of the temperature sensor 34, the flow ratio between the main exhaust gas 26 and bypass exhaust gas 28 changes.

For example, since the outlet exhaust gas temperature of the fuel economizer is low in an initial stage of boiler start-up, the flow ratio of the bypass exhaust gas 28 to the main exhaust gas 26 is characteristically high, and subsequently the ratio decreases with increases in the boiler load. That is, since the flow ratio between the two types of exhaust gas changes, so does an inflow pattern of the bypass exhaust gas 28 flowing into the main duct 16.

Even in such a case, the present example can adjust tilt angles of the adjustment vanes 48, thereby adjust the flow direction of the bypass exhaust gas 28 flowing into the main duct 16, and thereby equalize ratios between the flow rates of the main exhaust gas and flow rates of the bypass exhaust gas flowing into the individual sub-channels formed by the partition plates 44.

For example, since the flow ratios between the main exhaust gas and bypass exhaust gas are uniform among the different sub-channels and are in good condition, if the flow rate of the main exhaust gas is decreased and flow rate of the bypass exhaust gas is increased, adjustments can be made as required, based on flow analysis, such as shifting the inflow direction of the bypass exhaust gas toward the downstream side of the main exhaust gas by turning the adjustment vanes 48.

Also, even when the flow ratio between the main exhaust gas 26 and bypass exhaust gas 28 is fixed to some extent, volumes of the bypass exhaust gas 28 flowing through the respective sub-channels formed by the partition plates 44 vary from one another, differing from a design value, the adjustment vanes 48 can be used to make adjustments so as to produce a uniform flow.

The tilt angles of the adjustment vanes 48 can be adjusted based on the flow ratio between the main exhaust gas 26 and bypass exhaust gas 28. For example, the flow ratio between the two types of exhaust gas and the corresponding tilt angles of the adjustment vanes which will equalize the flow ratios between the two types of exhaust gas among the respective sub-channels can be determined by experiment or the like in advance and stored in memory 25 as a table or as numeric values. Then, by installing flowmeters 27, 29 in the two ducts to output the tilt angles using flowmeter readings as input values, the tilt angles can be adjusted by any suitable mechanism 31 based on the output value.

Third Example

Figure 5:
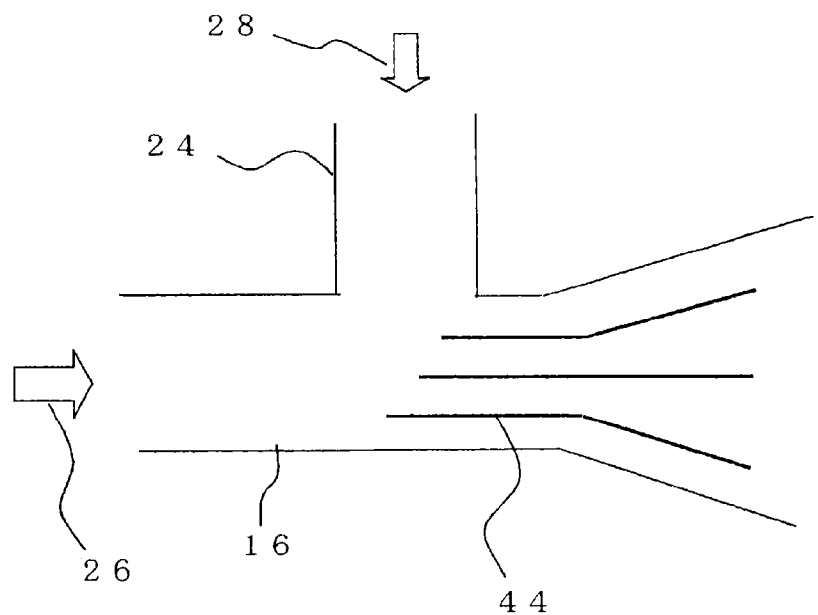
FIG. 5 is a diagram showing a third example of the characteristic portion of the exhaust gas denitrizer.

FIG. 5 is an enlarged view of the meeting place 42 between the main duct 16 and bypass duct 24 shown in FIG. 1 and is a diagram showing a third example of the characteristic portion of the exhaust gas denitrizer. The present example is a variation of the first example and uses different forms of the main duct 16 and partition plates 44. Therefore, only differences from the first example will be described, and description of the other parts will be omitted.

As shown in FIG. 5, according to the present example, the main duct 16 is shaped to gradually increase in diameter as it goes downstream from near the meeting place of the two types of exhaust gas. In this case, being installed with the plate surfaces turned to the inflow direction of the bypass exhaust gas 28, the partition plates 44 extend straight along the flowing direction of the main exhaust gas 26 near the meeting place, then extend along the flowing direction by spreading with increases in the diameter of the main duct, and thereby partition the main exhaust gas channel into a plurality of sub-channels. Also, the upstream-side ends of the partition plates along the inflow direction of the main exhaust gas face the incoming bypass exhaust gas by being shifted from one another toward the upstream side of the main exhaust gas starting from the inflow side of the bypass exhaust gas.

According to the present example, as in the case of the first example, the bypass exhaust gas 28 is spread uniformly from the near side toward the far side in the inflow direction of the bypass exhaust gas, that is, in radial direction of the main duct, equalizing flow ratios between the main exhaust gas and bypass exhaust gas among the respective sub-channels.

Fourth Example

Figure 6:
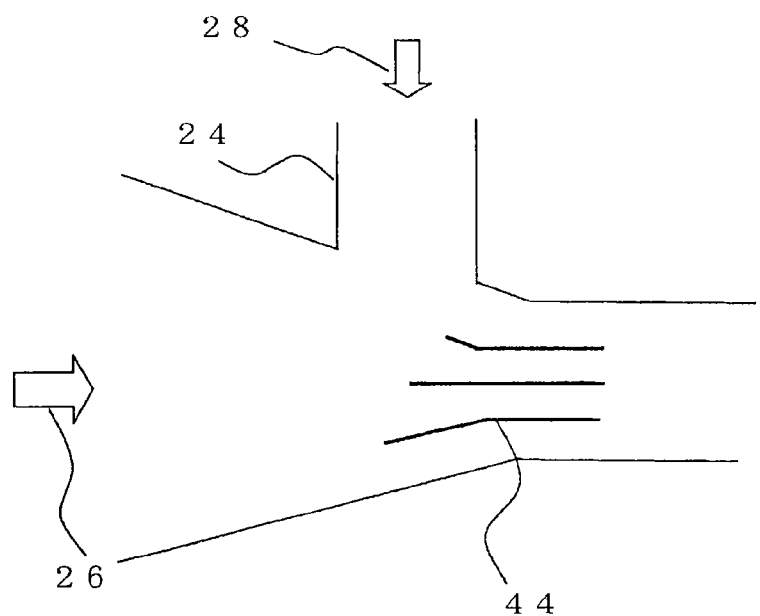
FIG. 6 is a diagram showing a fourth example of the characteristic portion of the exhaust gas denitrizer.

FIG. 6 is an enlarged view of the meeting place 42 between the main duct 16 and bypass duct 24 shown in FIG. 1 and is a diagram showing a fourth example of the characteristic portion of the exhaust gas denitrizer. The present example is a variation of the first example and uses different forms of the main duct 16 and partition plates 44. Therefore, only differences from the first example will be described, and description of the other parts will be omitted.

As shown in FIG. 6, according to the present example, the main duct 16 is shaped to gradually decrease in diameter as it goes from the upstream side to near the meeting place of the two types of exhaust gas. In this case, near the meeting place, the partition plates 44 extend along the flowing direction of the main exhaust gas 26 by coming closer to each other with decreases in the diameter of the main duct. Then, the partition plates 44 extend straight along the flowing direction of the main exhaust gas 26 by conforming to the duct shape.

Also, in this case again, with the plate surfaces turned to the inflow direction of the bypass exhaust gas 28, the partition plates 44 partition the main exhaust gas channel into a plurality of sub-channels. Furthermore, the upstream-side ends of the partition plates along the inflow direction of the main exhaust gas face the incoming bypass exhaust gas by being shifted from one another toward the upstream side of the main exhaust gas starting from the inflow side of the bypass exhaust gas.

According to the present example, as in the case of the first example, the bypass exhaust gas 28 is spread uniformly from the near side toward the far side in the inflow direction of the bypass exhaust gas, that is, in radial direction of the main duct, equalizing flow ratios between the main exhaust gas and bypass exhaust gas among the respective sub-channels.

Fifth Example

Figure 7:
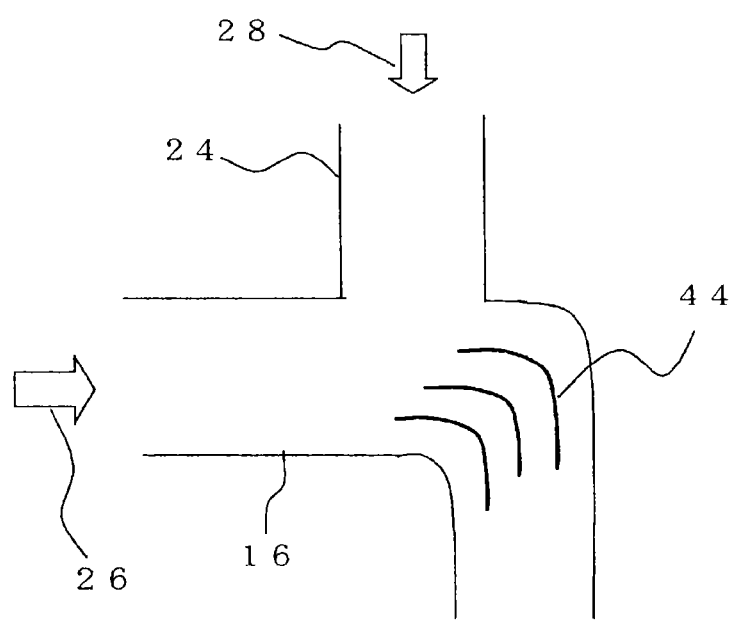
FIG. 7 is a diagram showing a fifth example of the characteristic portion of the exhaust gas denitrizer.

FIG. 7 is an enlarged view of the meeting place 42 between the main duct 16 and bypass duct 24 shown in FIG. 1 and is a diagram showing a fifth example of the characteristic portion of the exhaust gas denitrizer. The present example is a variation of the first example and uses different forms of the main duct 16 and partition plates 44. Therefore, only differences from the first example will be described, and description of the other parts will be omitted.

As shown in FIG. 7, according to the present example, the main duct 16 is formed in such a shape as to bend downstream side from near the meeting place. In this case, near the meeting place, the partition plates 44 extend straight along the flowing direction of the main exhaust gas 26 in conformance to the main duct shape. Then, the partition plates 44 extend by curving in conformance to the duct shape.

Again, with the plate surfaces turned to the inflow direction of the bypass exhaust gas 28, the partition plates 44 partition the main exhaust gas channel into a plurality of sub-channels. Furthermore, the upstream-side ends of the partition plates along the inflow direction of the main exhaust gas face the incoming bypass exhaust gas by being shifted from one another toward the upstream side of the main exhaust gas starting from the inflow side of the bypass exhaust gas.

According to the present example, as in the case of the first example, the bypass exhaust gas 28 is spread uniformly from the near side toward the far side in the inflow direction of the bypass exhaust gas, that is, in radial direction of the main duct, equalizing flow ratios between the main exhaust gas and bypass exhaust gas among the respective sub-channels.

The point is that the temperature of the rejoined exhaust gas can be evened out quickly while curbing increases in pressure losses of the main duct if at the meeting place between the main exhaust gas and bypass exhaust gas in the main duct, partition plates are installed with the plate surfaces turned to the inflow direction of the bypass exhaust gas, partitioning the main exhaust gas channel into a plurality of sub-channels along the flowing direction of the main exhaust gas and the upstream-side ends of the partition plates along the inflow direction of the main exhaust gas are caused to face the incoming bypass exhaust gas by being shifted from one another toward the upstream side of the main exhaust gas starting from an inflow side of the bypass exhaust gas regardless of whether the main duct is shaped to expand, contract, or bend.

In addition, the expanded, contracted, or bent shape of the main duct is suitable because the partition plates 44 play a role in straightening the gas flow although such a shape can cause disturbances in the gas flow.

The invention claimed is:

1. An exhaust gas denitrizer comprising:
    a main duct adapted to pass exhaust combustion gas discharged from a furnace and containing sulfur oxides and nitrogen oxides;
    a heat exchanger placed in the main duct and adapted to cool the exhaust combustion gas by heat exchange;
    a bypass duct adapted to branch off from the main duct upstream of the heat exchanger, bypass the heat exchanger, and rejoin the main duct;
    an ammonia feed system adapted to supply ammonia gas to the exhaust combustion gas after bypass exhaust gas flowing through the bypass duct rejoins main exhaust gas flowing through the main duct; and
    a denitrification reactor adapted to remove nitrogen oxides from the exhaust combustion gas supplied with the ammonia gas, wherein
    at a meeting place between the main exhaust gas and the bypass exhaust gas in the main duct, a plurality of partition plates are installed with plate surfaces turned to an inflow direction of the bypass exhaust gas, partitioning a main exhaust gas channel into a plurality of sub-channels along a flowing direction of the main exhaust gas, where upstream-side ends of the plurality of partition plates along an inflow direction of the main exhaust gas face the incoming bypass exhaust gas by being shifted from one another toward an upstream side of the main exhaust gas starting from an inflow side of the bypass exhaust gas, and
    further comprising a turnable adjustment vane installed at the meeting place of the bypass duct and the main duct to adjust flow direction of the bypass exhaust gas flowing into the main duct.

2. The exhaust gas denitrizer system according to claim 1, further comprising means for measuring flow of the main exhaust gas and the bypass exhaust gas, and adjusting a tilt angle of the adjustment vane based on flow ratio between the main exhaust gas and bypass exhaust gas.

3. The exhaust gas denitrizer system according to claim 1, wherein:
    a plurality of the heat exchangers are installed in series; and
    the bypass duct is installed so as to bypass at least the heat exchanger located most downstream.

* * * * *